US008824461B2

(12) United States Patent
Doverspike et al.

(10) Patent No.: US 8,824,461 B2
(45) Date of Patent: *Sep. 2, 2014

(54) METHOD AND APPARATUS FOR PROVIDING A CONTROL PLANE ACROSS MULTIPLE OPTICAL NETWORK DOMAINS

(71) Applicant: AT&T Intellectual Property II, L.P., Atlanta, GA (US)

(72) Inventors: Robert Doverspike, Tinton Falls, NJ (US); Albert G. Greenberg, Seattle, WA (US); Guangzhi Li, Madison, NJ (US); Dongmei Wang, Madison, NJ (US); Jennifer Yates, Morristown, NJ (US); Joel M. Gottlieb, Somerset, NJ (US); Charles Robert Kalmanek, Short Hills, NJ (US); Panagiotis Sebos, Athens (GR)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/919,729

(22) Filed: Jun. 17, 2013

(65) Prior Publication Data
US 2013/0279899 A1 Oct. 24, 2013

Related U.S. Application Data

(63) Continuation of application No. 11/315,914, filed on Dec. 22, 2005, now Pat. No. 8,467,382.

(51) Int. Cl.
*H04L 12/66* (2006.01)
*H04L 12/28* (2006.01)
*H04L 12/56* (2006.01)

(52) U.S. Cl.
CPC ............... *H04L 45/02* (2013.01); *H04L 45/04* (2013.01); *H04L 45/10* (2013.01); *H04L 45/28* (2013.01); *H04L 45/52* (2013.01)
USPC ........................ 370/355; 370/397; 370/399

(58) Field of Classification Search
None
See application file for complete search history.

(56) References Cited

U.S. PATENT DOCUMENTS

| | | | |
|---|---|---|---|
| 8,467,382 | B1 | 6/2013 | Doverspike et al. |
| 2004/0136371 | A1 | 7/2004 | Muralidhar et al. |
| 2005/0013241 | A1 | 1/2005 | Beller et al. |
| 2006/0026225 | A1 | 2/2006 | Canali et al. |
| 2006/0274718 | A1 | 12/2006 | Butenweg et al. |

OTHER PUBLICATIONS

D. Wang, G. Li, J. Yates, P. Sebos, C. Kalmanek, A. Greenberg, Optical NNI inter-working demonstration, All-Optical Networking: Existing and Emerging Architecture and Applications/Dynamic Enablers of Next-Generation Optical Communications Systems, 2002 IEEE/LEOS Summer Topic, pp. 41-42.*

(Continued)

*Primary Examiner* — John Blanton
*Assistant Examiner* — Christopher Crutchfield

(57) ABSTRACT

Method and apparatus for providing a control plane across multiple optical network domains is described. In one example, topology and resource discovery is employed in a transport network having a plurality of control domains. Topology information for each of the control domains is summarized to produce summarized topology information. The summarized topology information for each of the control domains is exchanged among the control domains. At each of the control domains, the summarized topology information of each of the control domains is combined to produce combined topology information. The combined topology information is passed among network elements within each of the control domains using an intra-domain routing protocol.

18 Claims, 5 Drawing Sheets

(56) References Cited

OTHER PUBLICATIONS

D. Saha, B. Rajagopalan, IP Over Optical Networks, Tellium, North American Network Operators Group, Meeting 20, Oct. 24, 2000, pp. 1-61.*

Chang, K. Owens, S. Makam, B. Mack-Crane, and C. Huang, A Path Protection/Restoration Mechanism for MPLS Networks, IETF Draft, draft-chang-mpls-path-protection-02, Nov. 2000, pp. 1-24.*

Wang et al., Optical NNI Inter-working Demonstration, All-Optical Networking: Existing and Emerging Architecture and Applications/ Dynamic Enablers of Next-Generation Optical Communications Systems, 2002 IEEE/LEOS Summer Topic, pp. 41-42.

Wang et al., OSPF for Routing Information Exchange Across Metro/ Core Optical Networks, Optical Networks Magazine, vol. 3, Sep. 2002.

Owens et al., A Path Protection/Restoration Mechanism for MPLS Networks, IETF Draft, draft-chang-mpls-path-protection-02, Nov. 2000, pp. 1-24.

Lang et al., Generalized Multi-Protocol Label Switching (GMPLS) Recovery Functional Specification, IETF Draft Specification draft-ietf-ccamp-gmpls-recovery-functional-03, pp. 1-21, Oct. 2004.

Dharanikota et al., Multi-layer Protection and Restoration Requirements, Submission OIF2001.367 to the Optical Interworking Forum, 2001, Jul. 23, 2011, pp. 1-42.

Saha et al., IP Over Optical Networks, Tellium, North American Network Operators Group, Meeting 20, Oct. 24, 2000, pp. 1-61), Chang et al. (Owens et al., A Path Protection/Restoration Mechanism for MPLS Networks, IETF Draft, draft-chang-mpls-path-protection-02, Nov. 2000, p. 1-24.

Vasseur et al., Inter-AS MPLS Traffic Engineering, IETF Draft, Jun. 2003.

Szviatovski et al., On the Effectiveness of Restoration Path Computation Methods, IEEE International Conference on Communications, 2002, pp. 2312-2317.

* cited by examiner

METHOD AND APPARATUS FOR PROVIDING A CONTROL PLANE ACROSS MULTIPLE OPTICAL NETWORK DOMAINS

This application is a continuation of U.S. patent application Ser. No. 11/315,914, filed Dec. 22, 2005, which is currently allowed and is herein incorporated in its entirety.

BACKGROUND OF THE INVENTION

1. Field of the Invention

Embodiments of the present invention generally relate to optical transport networks and, more particularly, to a method and apparatus for providing a control plane across multiple optical network domains.

2. Description of the Related Art

Traditionally, transport networks are managed by centralized management systems, which receive connection requests, perform path selection, and establish connections through transport network elements. Recently, the intelligence for transport network functions, such as topology and resource discovery, automated connection provisioning, and failure recovery, are being moved into the network elements through the emergence of distributed transport control planes. Control plane standards that extend signaling protocols from packet networks are being developed. The Internet Engineering Task Force (IETF) has extended Internet Protocol (IP)-based protocols used in the Multi-Protocol Label Switching (MPLS) control plane to define Generalized Multi-Protocol Label Switching (GMPLS).

Standards development, however, has lagged vendor implementations, resulting in network operators deploying sub-networks running vendor-specific control planes that do not inter-work. In addition, company mergers and the associated network management integration complexities, scalability concerns, as well as other economic factors have led to transport networks that often consist of several control islands referred to as control domains (CDs). A control domain is a sub-network in which all network nodes run a common control plane. A given transport network may include several control domains, each of which implements different control plane signaling and routing protocols. Accordingly, there exists a need in the art for a method and apparatus for providing a control plane across multiple optical network domains.

SUMMARY OF THE INVENTION

One aspect of the invention relates to a topology and resource discovery in a transport network having a plurality of control domains. Topology information for each of the control domains is summarized to produce summarized topology information. The summarized topology information for each of the control domains is exchanged among the control domains. At each of the control domains, the summarized topology information of each of the control domains is combined to produce combined topology information. The combined topology information is passed among network elements within each of the control domains using an intra-domain routing protocol to build inter-domain routing table and intra-domain topology.

Another aspect of the invention relates to provisioning a connection between a source and a destination in a transport network having a plurality of control domains. A connection request is received at an ingress network element in a control domain of the plurality of control domains. An egress node in the control domain is identified for the destination using a first inter-domain routing table stored in the ingress network element. A connection is constructed within the control domain using an intra-domain signaling protocol and topology information for the control domain. A next ingress network element of a next control domain of the plurality of control domains is identified using a second inter-domain routing table stored in the egress network element. The connection request is communicated to the next ingress network element using an inter-domain signaling protocol.

Another aspect of the invention relates to protection and restoration of a connection in a transport network having a plurality of control domains. In a transport network having a plurality of control domains, each control domain usually provides its own protection and restoration mechanism. The restoration scheme in this invention includes domain-by-domain restoration and re-provisioning. If failure occurs in the network, each domain triggers its own restoration scheme without coordinating with other domains. After the source node detected the failure and waited a specific time and the failure was restored, the source would try to re-provision the connection to the destination node.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
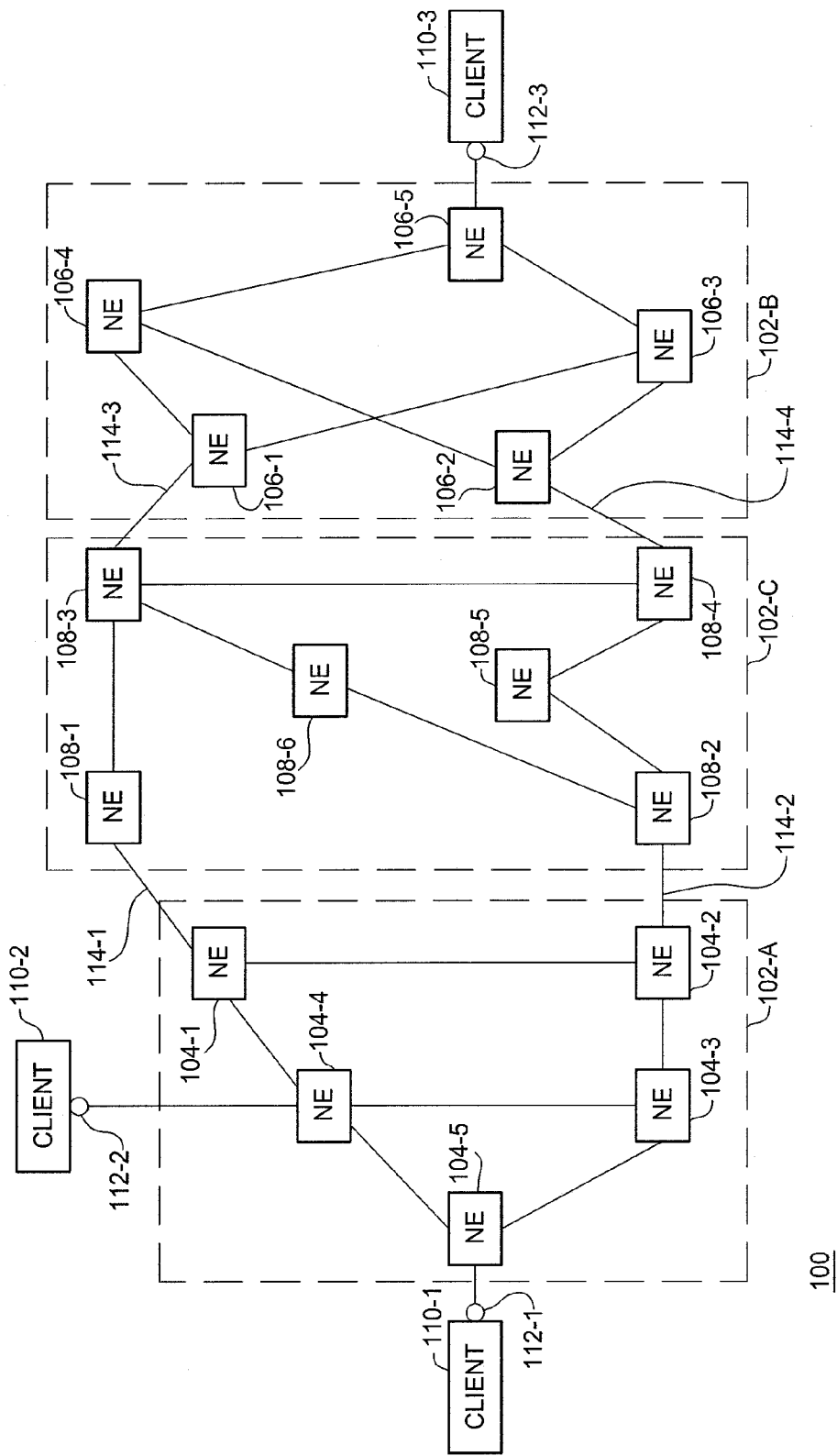
FIG. 1 is a block diagram depicting an exemplary embodiment of a transport network in which the present invention may be employed.

FIG. 1 is a block diagram depicting an exemplary embodiment of a transport network 100 in which the present invention may be employed. The optical transport network 100 includes control domains 102A, 102B, and 102C (collectively referred to as control domains 102). The control domain 102A includes network elements (NEs) 104-1 through 104-5 (collectively referred to as NEs 104). The control domain 102B includes NEs 106-1 through 106-6 (collectively referred to as NEs 106). The control domain 102C includes NEs 108-1 through 108-5 (collectively referred to as NEs 108). The optical transport network 100 facilitates communication among client elements 110-1, 110-2, and 110-3 (collectively referred to as client elements 110). The client elements 110-1 through 110-3 respectively include optical nodes 112-1 through 112-3 (collectively referred to as optical nodes 112) that define an entrance to and an exit from the optical transport network 102. Each of the client elements 110 may comprise a router, switch, or the like type network element that provides an interface to another network (e.g., a packet-switched network).

Some of the network elements in each of the control domains 102 are located at a border between another control domain and are referred to as border nodes. The NEs 104-1 and 104-2 are border nodes of the control domain 102A. The NEs 106-1 through 106-4 are border nodes of the control domain 102B. The NEs 108-1 through 108-4 are border nodes of the control domain 102C. The network elements in each of the control domains 102 are interconnected by internal optical links. The control domains 102 are interconnected by external optical links. In the embodiment shown, the NEs 104-1 and 108-1, the NEs 104-2 and 108-2, the NEs 108-3 and 106-1, and the NEs 108-4 and 106-2 are connected by external links 114-1 through 114-4, respectively (collectively referred to as external links 114).

Communication between the client elements 110 is effected by establishing connections through the optical transport network 102. A "connection" is defined as an optical cross-connect supported, fixed bandwidth path between a source and destination. A connection is also referred to as a lightpath. The transport network 102 includes a data plane and a control plane. The data plane is responsible to physically transferring data from one client element to another. The control plane is responsible for tracking network topology and the state of network resources and for establishing, removing, and maintaining connections between network elements. In accordance with one embodiment of the invention, the control plane for the transport network 102 is configured to manage end-to-end connections between client elements across the control domains 102. The functions of the control plane are achieved using a routing protocol for topology and resource discovery, and a signaling protocol for connection provisioning, restoration, and deletion. The control plane is divided into intra-domain routing and signaling protocols and inter-domain routing and signaling protocols.

In particular, each of the control domains 102 is a sub-network in which all nodes thereof are configured to employ intra-domain routing and signal protocols for establishing connection segments within the domain. The intra-domain routing and signaling protocols employed by the control domains 102A, 102B, and 102C may be the same or may be different from one domain to the next. As described below, inter-domain routing and signaling protocols are used to implement hop-by-hop connection management across the control domains 102 and establish end-to-end connections between client elements.

For purposes of clarity by example, a particular configuration of the transport network 102 is shown in FIG. 1. Those skilled in the art will appreciate that the invention may be employed in a multitude of other configurations. In general, a transport network comprises a plurality of control domains, each of which includes a plurality of network elements. The control domains may be interconnected by any number of external links.

Figure 2:
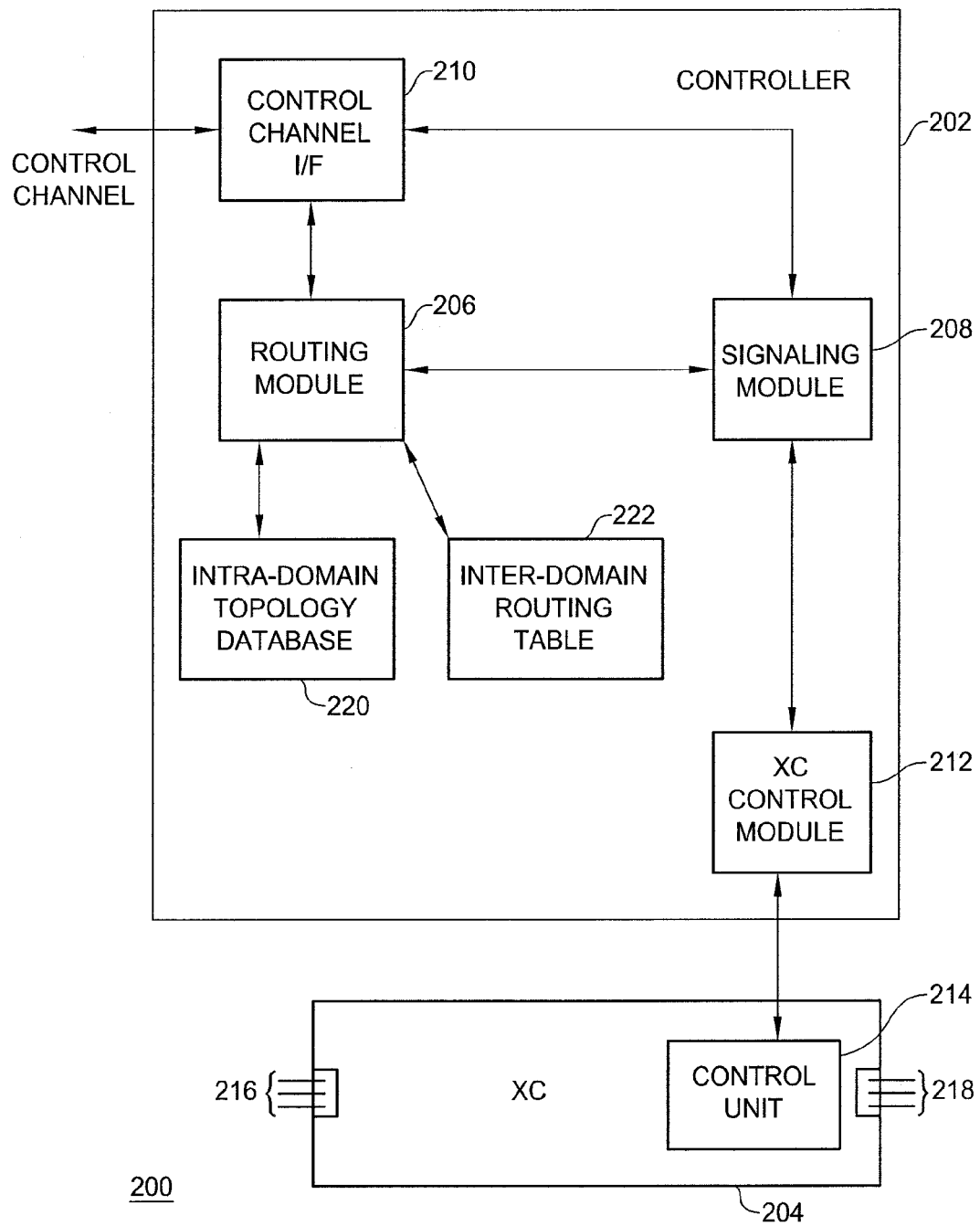
FIG. 2 is a block diagram depicting an exemplary embodiment of a network element in accordance with one or more aspects of the invention.

FIG. 2 is a block diagram depicting an exemplary embodiment of a network element 200 in accordance with one or more aspects of the invention. Each of the network elements in FIG. 1 may be implemented using the network element 200. The network element 200 includes a controller 202 and an optical cross-connect 204. The optical cross-connect includes a control unit 214, an input ports 216, and output ports 218. The optical cross-connect 204 may comprise any type of optical cross-connect known in the art, such as a fiber switch cross-connect, a wavelength selective cross-connect, and the like. The optical cross-connect 204 is configured to selectively switch optical signals from optical fibers at the input ports 216 to optical fibers at the output ports 218. The selectivity is controlled by the control unit 214, which receives control signals from the controller 202. For example, the control unit 214 may comprise a central processing unit (CPU) and associated cross-connect control software.

The controller 202 includes a routing module 206, a signaling module 208, a control channel interface (I/F) 210, a control module 212. an intra-domain topology database 220, and an inter-domain routing table 222. The control channel interface 210 is configured to receive control plane information from a control channel. The control channel interface 210 provides the control plane information to the routing module 206 and the signaling module 208. The types of control plane information received by the control channel interface 210 are described below with respect to operation of the routing module 206 and the signaling module 208. Operation of the routing module 206 and the signaling module 208 is first described with respect to intra-domain control plane functions, and then with respect to inter-domain control plane functions.

The routing module 206 is configured to implement an intra-domain routing protocol for the control domain for the network element 200 ("local domain"). The intra-domain routing protocol allows for domain topology and resource discovery within the local domain. The intra-domain routing protocol may comprise an interior gateway protocol (IGP), such as Interior Gateway Routing Protocol (IRGP), Open Shortest Path First (OSPF), Routing Information Protocol (RIP), or Intermediate System to Intermediate System (IS-IS) protocol. Using an IGP, the routing module 206 maintains local node and link resource inventory as connections are established, restored, and removed ("local inventory"). The local inventory may include link source, destination, type (e.g., SONET, Ethernet), capacity (number of total, available, and reserved channels), a link administration weight, and a list of shared risk link groups (SRLGs). The routing module 206 floods the local inventory through the local domain via the control channel using the intra-domain routing protocol. Through this process, each network element in the local domain obtains a complete representation of the local domain topology and resource utilization. The domain topology and resource utilization information is received from the control channel at the control channel interface 210 and stored in the intra-domain topology database 220.

The signaling module 208 is configured to receive intra-domain topology and resource information from the routing module 206. The signaling module 208 uses the intra-domain topology and resource information to select paths for connection provisioning and restoration. In one embodiment, connection provisioning signaling is based on ReSource reservation Protocol with Traffic Engineering extensions (RSVP-TE). The signaling process is responsible for managing the local resources—i.e., allocating them to connections, maintaining state information, and aggregating resource information to be flooded to other network elements by the routing module 206. The signaling module 208 may also maintain state information for the optical cross-connect 204. The signaling module 208 is also configured to pass summarized local inventory information to the routing module 206.

For restoration, the signaling module 208 may utilize a shared mesh restoration procedure that pre-computes and reserves the necessary bandwidth for each restorable connection segment and ensures that there is adequate available bandwidth to recover from any planned failure event. In the event of a failure, alarms are generated and notification messages are sent to the network elements responsible for triggering the restoration route establishment.

Generally, restoration signaling mechanisms in a single domain include one request message that traverses from ingress node to egress node, and then a reply from egress to ingress. For correct operation, it is important to carefully consider the precise timing of control plane messages and the corresponding cross-connections in the data plane. One approach would be to perform cross-connection as each network element receives the first request message. This would lead to the fastest restoration time. However, if two optical cross-connects on either side of a link attempt to simultaneously allocate the same channel to two different bi-directional connections, performing the cross-connection on the request message can result in two customers being temporarily connected who should not have been. This scenario is known as misconnection. Misconnection can be avoided by not cross-connecting the first optical cross-connect along a connection's restoration path until it has received a reply message. Receipt of this message indicates that all contention has been resolved along the path. All other optical cross-connects along the restoration path can immediately perform the cross-connections upon receiving the request messages. This approach could slow down restoration a little, but ensures that misconnection is avoided.

The routing module 206 is further configured to implement an inter-domain routing protocol for the transport network. The inter-domain routing protocol provides for exchange of summarized inter-domain topology information between the control domains 102. The inter-domain routing table 222 includes routing information required to route connections across the control domains 102. The inter-domain routing table 222 allows an ingress network element receiving a connection request to select an egress network element in its domain for a particular destination client element. This route selection may differ for different client elements and may change in response to changing traffic loads both on external links and internal links with a domain. The routing module 206 computes the egress element in the inter-domain routing table 222 using intra-domain topology from the database 220 and summarized inter-domain topology data obtained using an inter-domain routing protocol. In one embodiment, the inter-domain routing protocol is based on OSPF. One or more network elements are selected in each of the control domains 102 as network-to-network interface (NNI) nodes to form an overly control plane. The NNI nodes use the inter-domain routing protocol to exchange summarized topology information for the control domains 102.

Figure 3:
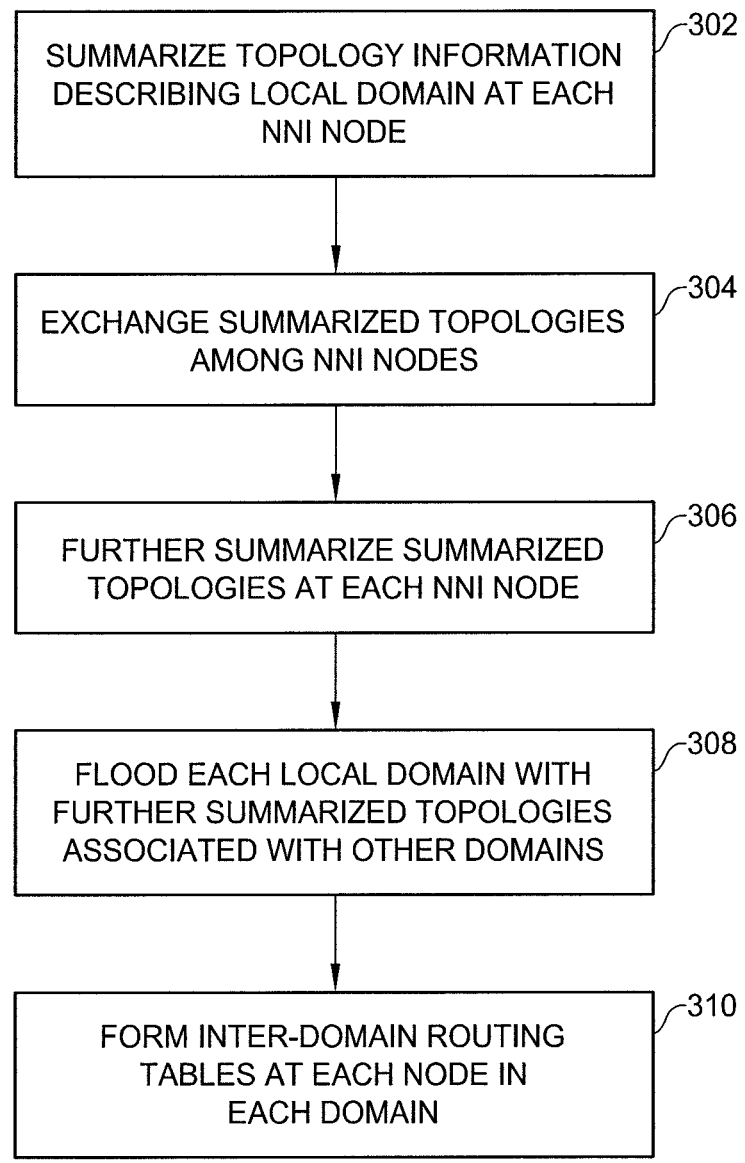
FIG. 3 is a flow diagram depicting an exemplary embodiment of a method for exchanging summarized inter-domain topology information between control domains in accordance with one or more aspects of the invention.

FIG. 3 is a flow diagram depicting an exemplary embodiment of a method 300 for exchanging summarized inter-domain topology information between control domains in accordance with one or more aspects of the invention. The method 300 begins at step 302, where the each NNI network element summarizes topology information describing the respective control domain thereof. In one embodiment, summarized topology information is represented as a set of network elements and links. Network elements may correspond to abstract (logical) or physical network elements. The network elements may in turn be categorized as either internal control domain nodes or border nodes. Links include external links and internal links. External links connect border nodes in two different control domains, and are typically physical links. Internal links may be either physical or abstract. For example, an abstract link may exist between a border node and any other border node that is physically connected to a different control domain.

At step 304, the summarized topologies are exchanged among the NNI network elements. In one embodiment, the routing module 206 automatically synchronizes the summarized topology information by exchanging summary opaque Link State Advertisements (LSAs) among the NNI network elements. Opaque LSAs are defined in request for comments (RFC) 2370. At step 306, each of the NNI nodes combines and further summarizes the summarized topologies for the control domains. At step 308, each NNI node floods its local domain with the further summarized topologies for the control domains. That is, each NNI network element passes the further summarized topologies to its intra-domain routing protocol. At step 310, inter-domain routing tables are formed at each node in each of the control domains in response to the further summarized topologies.

Returning to FIG. 2, the inter-domain routing table 222 provides entries for each destination, specifying the next inter-domain hop for connections routed across the local domain. This enables the use of hop-by-hop routing across control domains, as opposed to the strict explicit routing used within domains. Thus, inter-domain routing is achieved without affecting existing intra-domain routing protocols. In general, the inter-domain routing is able to support any intra-domain routing protocol, which is necessary due to proprietary intra-domain routing protocols and routing protocols based on other standards being developed.

Note that the OSPF syntax does not require the NNI network elements to be the border nodes. The LSAs describing the data plane topology simply need to carry the addresses of the border nodes. This is important for many reasons, including allowing centralized management systems to participate in NNI routing for control domains that are centrally controlled.

Figure 4:
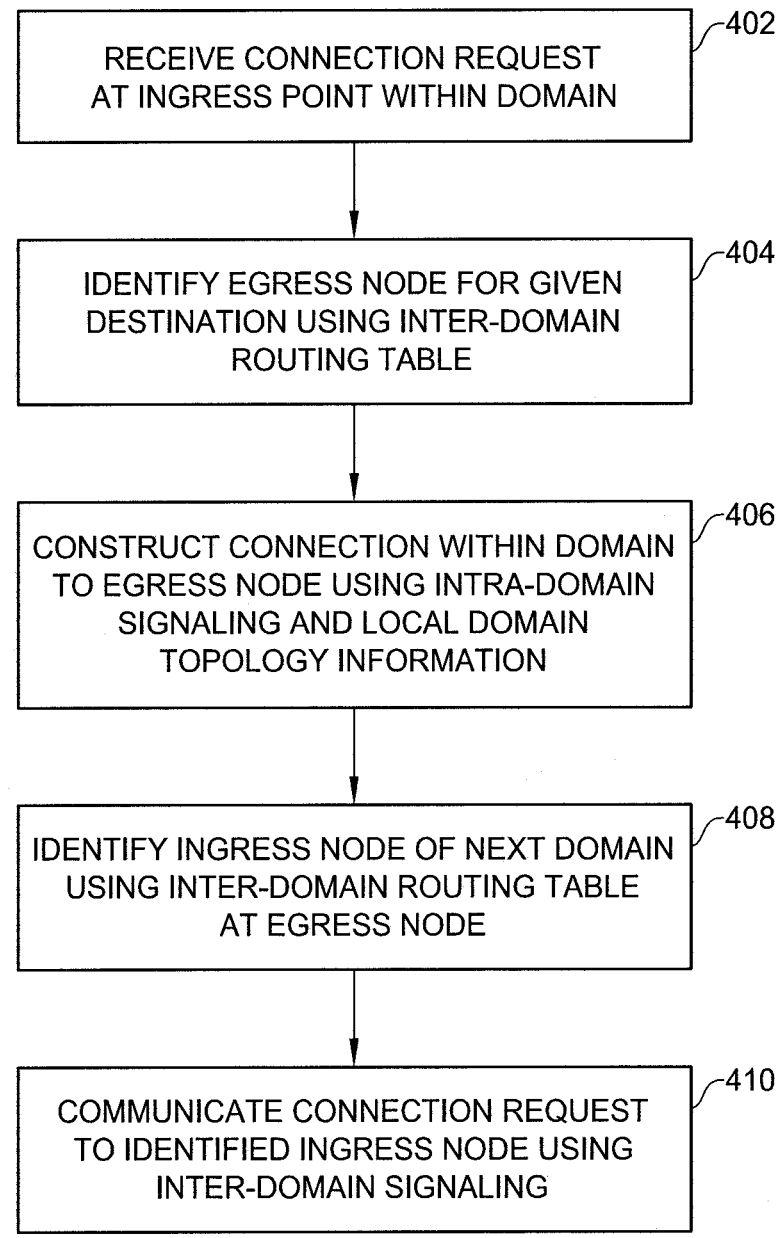
FIG. 4 is a flow diagram depicting an exemplary embodiment of a method for processing a connection in accordance with one or more aspects of the invention.

The signaling module 208 is configured to employ the uniform network interface (UNI) signaling protocol for inter-domain signaling. FIG. 4 is a flow diagram depicting an exemplary embodiment of a method 400 for processing a connection in accordance with one or more aspects of the invention. The method 400 begins at step 402, where a connection request is received at an ingress network element within a local domain. At step 404, an egress network element in the local domain is identified for the destination using the inter-domain routing table 222. At step 406, a connection is constructed within the local domain to the egress node using intra-domain signaling and local domain topology information. At step 408, an ingress node of the next domain is identified using the inter-domain table 222 at the egress node. Because one egress node may connect to multiple ingress nodes within other domains and vice versa, once a connection request has reached the egress node, the inter-domain routing table 222 is used to select the ingress node of the next domain. At step 410, the connection request is communicated to the identified ingress node using inter-domain signaling. The method 400 is repeated across the control domains until the connection request reaches the destination.

To illustrate inter-domain connection provisioning with a specific example, consider routing a connection across the transport network 100 depicted in FIG. 1 from the client element 110-1 to the client element 110-3. The connection request is received in the control domain 102A at the network element 104-5. The network element 104-5 selects a route to an egress node in the control domain 102A—either to the network element 104-1 or the network element 104-2—using the inter-domain routing tables created as a result of the inter-domain routing process. Assume the network element 104-1 is selected as the egress node. The intra-domain routing and signaling protocols are used to establish the connection to the network element 104-1. Once the connection request is received at the network element 104-1, another routing decision is made regarding how the connection is to be established to the next domain—the control domain 102C. Inter-domain signaling is then used to signal the connection request between the control domains 102A and 102C. Inter-domain routing tables are then used to select the egress node from the control domain 102C, and so on, until the connection request is successfully signaled to the client element 110-3.

Using this approach, the inter-domain signaling protocol between adjacent network border nodes (e.g., ingress/egress nodes) only requires that the destination address for the connection be conveyed. No explicit routing information is needed. UNI signaling satisfies this requirement and can be directly applied for inter-domain signaling. Importantly, using this approach, no change is required to the intra-domain signaling protocol. While UNI signaling has been described as a specific example, those skilled in the art will appreciate that the invention may employ other NNI signaling protocols for inter-domain signaling.

Recovery from facility failures in the transport network 102 is achieved using domain-by-domain restoration, where each control domain is responsible for restoring the connection segment inside it. External links utilize link protection. The shared mesh restoration procedure described above is used for restoration within each of the control domains 102. Using this approach, restoration signaling after failure is constrained to the domain(s) directly affected by a failure, limiting the size of the resulting signaling storm. It also eliminates the need for exchange of SRLG information across the domain interfaces for restoration, greatly simplifying the route calculation complexity for connection and backup path provisioning. Although multiple control domain links may share a single SRLG, and thus fail simultaneously, the failed connections will be restored without coordination among the CDs.

Returning to FIG. 2, the XC control module 212 interfaces with the control unit 214 of the optical cross-connect using a defined interface, such as the IETF's General Switch Management Protocol (GSMP). The interface provides for communication of connect and disconnect commands with acknowledgments and alarm reporting. The XC control module 212 generates commands for the optical cross-connect 204 in response to control information received from the signaling module 208. While the XC control module 212 is shown in the controller 202, in another embodiment, the function of the XC control module 212 may be integrated with the optical cross-connect 204. Commands may be sent to the optical cross-connect 204 from the signaling module 208.

Figure 5:
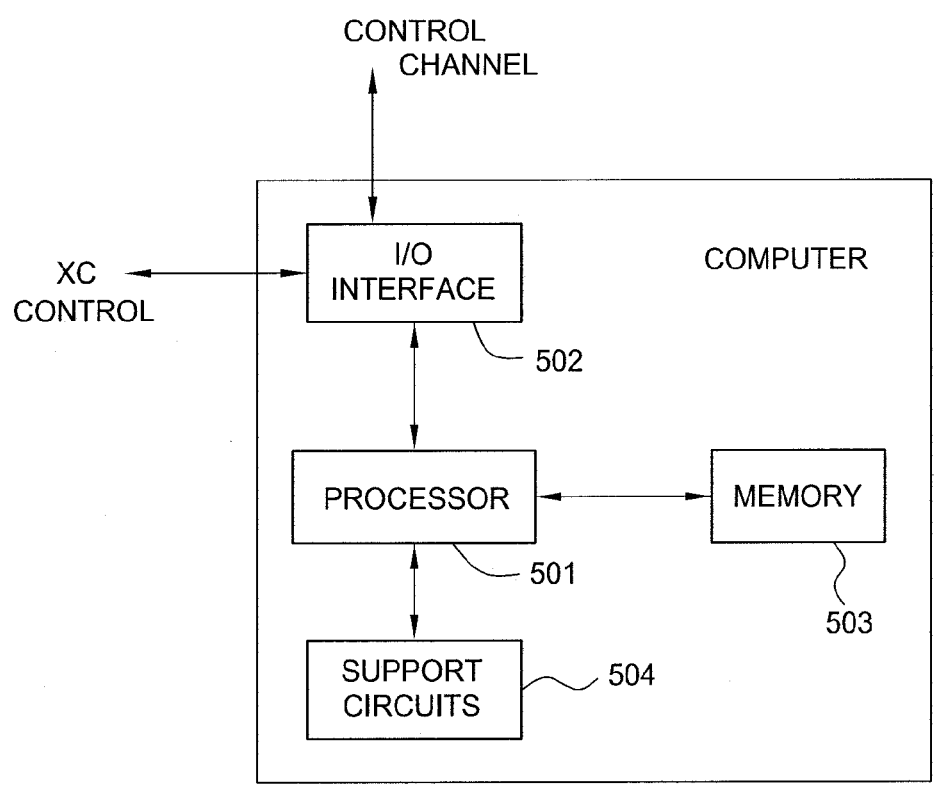
FIG. 5 is a block diagram depicting an exemplary embodiment of a computer configured to implement a controller for the network node of FIG. 2.

FIG. 5 is a block diagram depicting an exemplary embodiment of a computer 500. The computer 500 may be used to implement the controller 202 of FIG. 2. The computer 500 includes a processor 501, a memory 503, various support circuits 504, and an I/O interface 502. The processor 501 may be any type of microprocessor known in the art. The support circuits 504 for the processor 501 include conventional cache, power supplies, clock circuits, data registers, I/O interfaces, and the like. The I/O interface 502 may be directly coupled to the memory 503 or coupled through the processor 501. The I/O interface 502 is configured to receive control information from the control channel and provide control signals to the optical cross-connect 204.

The memory 503 may store all or portions of one or more programs and/or data to implement the processes and methods described herein. Notably, the memory 503 may store program code to be executed by the processor 501 for implementing the routing module 206, the signaling module 208, and the control module 212. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 500 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 503. The memory 503 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method of topology and resource discovery in a transport network having a plurality of control domains, comprising:

summarizing, by a processor, topology information for each of the control domains to produce summarized topology information for each of the control domains, wherein the summarized topology information for each control domain of the control domains comprises abstract links, each of the abstract links being between a border node in the each control domain and at least one other border node in the each control domain that is physically connected to another of the plurality of control domains;

exchanging the summarized topology information for each of the control domains among the plurality of control domains via external links;

combining, at each of the control domains, the summarized topology information of each of the control domains to produce combined topology information;

passing the combined topology information among network elements within each of the control domains using an intra-domain routing protocol;

attempting to restore a connection segment in one of the plurality of control domains upon a detection of a facility failure, wherein the attempting to restore comprises a use of a reply message; and re-provisioning the connection segment within the one control domain when the connection segment is not restored after a specific time period using the combined topology information.

2. The method of claim 1, wherein the exchanging comprises:

synchronizing the summarized topology information for each of the control domains by exchanging summary opaque link state advertisements among the plurality of control domains.

3. The method of claim 1, wherein the intra-domain routing protocol comprises an interior gateway protocol.

4. The method of claim 1, further comprising:

forming inter-domain routing tables at each of the network elements.

5. The method of claim 2, wherein the summarized topology information is synchronized for each of the control domains using an open shortest path first protocol.

6. A method of provisioning a connection in a transport network having a plurality of control domains, comprising:

receiving a connection request by a processor of an ingress network element in a control domain of the plurality of control domains;

identifying an egress network element in the control domain for a destination of the connection request using a first inter-domain routing table stored in the ingress network element;

constructing the connection within the control domain using an intra-domain signaling protocol and topology information for the control domain;

identifying a next ingress network element of a next control domain of the plurality of control domains using a second inter-domain routing table stored in the egress network element;

communicating the connection request to the next ingress network element using an inter-domain signaling protocol via an external link;

attempting to restore a connection segment in the control domain upon a detection of a facility failure, wherein the attempting to restore comprises a use of a reply message; and re-provisioning the connection segment within the control domain when the connection segment is not restored after a specific time period using combined topology information, wherein the combined topology information comprises summarized topology information of each of the plurality of control domains.

7. The method of claim 6, further comprising:

repeating the receiving the connection request, the identifying the egress node, the constructing the connection, the identifying the next ingress network element, and the communicating the connection request, until the connection request reaches the destination.

8. The method of claim 6, wherein each of the first inter-domain routing table and the second inter-domain routing table includes entries associating egress network elements in the control domain to destinations.

9. The method of claim 6, wherein the intra-domain signaling protocol comprises a resource reservation protocol with traffic engineering extensions.

10. The method of claim 6, wherein the inter-domain signaling protocol comprises a uniform network interface protocol.

11. A transport network, comprising:

a plurality of control domains, each control domain of the plurality of control domains including a plurality of network elements, each network element of the plurality of network elements including:

an intra-domain topology database for storing topology data for the each control domain;

an inter-domain routing table for storing routing information required to route connections across the plurality of control domains;

a routing module for employing an intra-domain routing protocol to manage the intra-domain topology database and an inter-domain routing protocol to manage the inter-domain routing table; and a signaling module for employing an intra-domain signaling protocol to manage connections for the each control domain, including provisioning and restoration, and an inter-domain signaling protocol to manage connections between the each control domain and another of the plurality of control domains;

wherein the plurality of control domains is connected by external links, and wherein the signaling modules in the plurality of network elements are configured to:

restore a connection segment in the each control domain upon a detection of a facility failure, wherein the signaling modules in the plurality of network elements are configured to restore the connection segment in the each control domain upon the detection of the facility failure by use of a reply message; and re-provision the connection segment within the each control domain when the connection segment is not restored after a specific time period using combined topology information, wherein the combined topology information comprises summarized topology information of each of the plurality of control domains.

12. The transport network of claim 11, wherein each network element of the plurality of network elements in each control domain of the plurality of control domains further comprises:

a cross-connect control module coupled to the signaling module; and an optical cross-connect in communication with the cross-connect control module.

13. The transport network of claim 11, wherein the inter-domain routing table is configured to store entries associating egress network elements in the each control domain to destinations.

14. The transport network of claim 11, wherein the intra-domain routing protocol comprises an interior gateway protocol.

15. The transport network of claim 11, wherein the inter-domain routing protocol comprises an open shortest path first protocol.

16. The transport network of claim 11, wherein the intra-domain signaling protocol comprises a resource reservation protocol with traffic engineering extensions.

17. The transport network of claim 11, wherein the inter-domain signaling protocol comprises uniform network interface protocol.

18. The transport network of claim 15, wherein the routing module is configured to employ the open shortest path first protocol to synchronize the summarized topology information for each of the plurality of control domains by exchanging summary opaque link state advertisements among the plurality of control domains.

* * * * *